(12) United States Patent
Mochida

(10) Patent No.: US 6,473,290 B2
(45) Date of Patent: Oct. 29, 2002

(54) CAPACITANCE-TYPE EXTERNAL-FORCE DETECTING DEVICE WITH IMPROVED SENSITIVITY

(75) Inventor: Yoichi Mochida, Fujisawa (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/872,312

(22) Filed: Jun. 1, 2001

(65) Prior Publication Data
US 2002/0083777 A1 Jul. 4, 2002

(30) Foreign Application Priority Data
Jun. 2, 2000 (JP) .................................. 2000-166547

(51) Int. Cl.$^7$ ................................................ H01G 5/18
(52) U.S. Cl. .................... 361/291; 361/290; 361/293; 361/289
(58) Field of Search ................................ 361/290, 291, 361/292, 280, 281, 282, 277, 278, 298.2, 293, 289, 796

(56) References Cited

U.S. PATENT DOCUMENTS

| | | | | |
|---|---|---|---|---|
| 5,229,911 A | * | 7/1993 | Ditlya | 361/277 |
| 5,375,033 A | * | 12/1994 | MacDonald | 361/281 |
| 5,569,852 A | * | 10/1996 | Marek et al. | 73/514 |
| 5,801,313 A | * | 9/1998 | Horibata et al. | 73/718 |
| 6,151,966 A | | 11/2000 | Sakai et al. | |
| 6,215,644 B1 | * | 4/2001 | Dhuler | 361/280 |

FOREIGN PATENT DOCUMENTS

| | | |
|---|---|---|
| DE | 1813077 | 7/1970 |
| DE | 19921863 | 11/1999 |
| DE | 19832905 | 2/2000 |
| EP | 0822415 | 2/1998 |
| JP | 9-318656 | 12/1997 |
| JP | 410206169 A | * 8/1998 |
| JP | 11-337342 | 12/1999 |

* cited by examiner

Primary Examiner—Dean A. Reichard
Assistant Examiner—Nguyen Ha
(74) Attorney, Agent, or Firm—Ostrolenk, Faber, Gerb & Soffen, LLP (57) ABSTRACT

A capacitance-type external-force detecting device includes a substrate, a moveable unit which is supported by the substrate via a supporting beam and which can be displaced in the detecting direction, a comb-shaped fixed electrode provided on the substrate and including a plurality of fixed electrode units spaced in the detecting direction, a comb-shaped moveable electrode provided on the moveable unit and including a plurality of moveable-side electrode units provided between the corresponding fixed electrode units so that the moveable-side electrode units are meshed with the corresponding fixed electrode units, and a capacitance-detecting unit for detecting the displacement amount of the moveable part, at the time when the external force causes the moveable unit to be displaced in the detecting direction, as the variation in the ratio of the overall capacitance between the fixed electrode units and the moveable electrode units and for outputting a voltage signal substantially in proportion thereto.

27 Claims, 8 Drawing Sheets

RATIO X OF ELECTRODE DISTANCES d3 TO d4 (d3/d4)

CAPACITANCE-TYPE EXTERNAL-FORCE DETECTING DEVICE WITH IMPROVED SENSITIVITY

BACKGROUND OF THE INVENTION

1. Field of the Invention

The present invention relates to a capacitance-type external-force detecting device typically used for detecting a physical parameter such as an angular velocity or acceleration based on a variation in capacitance.

2. Description of the Related Art

Normally, capacitance-type external-force detecting devices have been used, for example, as angular velocity sensors or acceleration sensors. By causing a moveable unit provided on a substrate to be displaced in accordance with an external force, such as an angular velocity or acceleration, which causes the capacitance between the substrate and the moveable unit to be varied, these sensors detect the variation as an indication of the magnitude of the external force.

Two examples of an external-force detecting device are disclosed in Japanese Unexamined Patent Application Publication No. 11-337342 and Japanese Unexamined Patent Application Publication No. 9-318656. These devices include a substrate and a moveable unit which is supported by the substrate via a supporting beam (and which is moveable in the detecting direction). A comb-shaped fixed electrode is located on the substrate and has a plurality of fixed finger electrodes which are spaced apart in the detecting direction. A comb-shaped moveable electrode is provided on the moveable unit and has a plurality of moveable finger electrodes which are provided between the fixed finger electrodes of the fixed comb electrode so that the moveable finger electrodes mesh with the fixed finger electrodes. A capacitance detecting circuit detects the displacement of the moveable finger electrodes relative to the fixed finger electrodes when an external force causes the moveable unit to be displaced in the detecting direction as a function of the variation in capacitance between the fixed finger electrodes and the moveable finger electrodes.

The comb-shaped fixed and moveable electrodes are formed by applying a fining process, such as etching processing, to, for example, silicon materials. The fixed finger electrodes are provided so as to line up at a predetermined spacing in the detecting direction of the external force. The moveable finger electrodes are provided between the fixed finger electrodes so as to mesh with the fixed finger electrodes with gaps therebetween.

A respective pair of fixed finger electrodes are disposed on opposite sides of most of the moveable finger electrodes in the detecting direction. The moveable finger electrode and one of the pair of fixed finger electrodes constitute a first capacitor therebetween and the moveable finger electrode and the other one of the fixed finger electrodes constitute a second capacitor therebetween. These two capacitors are connected in parallel to the capacitance detecting circuit via the fixed and the moveable finger electrodes.

The moveable finger electrode is closer to one of the fixed finger electrodes than it is to the other of the fixed finger electrodes, which makes the inter-electrode distance of the first capacitor shorter than that of the second capacitor.

When an external force such as the angular velocity or the acceleration is applied to the substrate, an inertia force and the like cause the moveable unit to be displaced in the detecting direction, which displaces the moveable finger electrode with respect to the fixed finger electrodes. Since this (the inter-electrode distance) varies the capacitance of the capacitor formed between these finger electrodes, the capacitance detecting circuit can detect the variation in capacitance between the fixed and moveable finger electrodes as an indication of the magnitude of the angular velocity, the acceleration, or the like.

For example, when the moveable finger electrode is displaced in one of the detecting directions, the inter-electrode distance of the first capacitor is decreased, increasing the capacitance thereof, and the inter-electrode distance of the second capacitor is increased, decreasing the capacitance thereof. Since the variation in overall capacitance of the capacitors is counterbalanced, and is decreased, detecting the variation in the capacitances becomes difficult.

Because the inter-electrode distance of the first capacitor is shorter than that of the second capacitor, minute variations in the inter-electrode distances cause the variation in the capacitance (the variation ratio of the capacitance) of the first capacitor to be greater than that of the second capacitor.

When the external force displaces the moveable finger electrode, since the capacitances of the first and second capacitors vary at different rates, the overall (net) capacitance of these capacitors varies. Therefore, the external-force detecting sensitivity of the capacitance detecting circuit can be improved.

In the foregoing art, there has been a demand for improving the external-force detecting sensitivity as much as possible by causing the overall (net) capacitance of the capacitor consisting of the first and second capacitors to vary greatly in accordance with displacement of the moveable finger electrode. One method for increasing the difference between the variation rates of the capacitances of these capacitors is to form the inter-electrode distance of the first capacitor to be shorter or that of the second capacitor to be longer.

However, it is difficult to finely adjust the inter-electrode distance of the first capacitor, since the processing accuracy and the like of etching processing restricts the minimum dimension between the finger electrodes. As a result, there is a limit to the improvement in the detecting sensitivity using a fining process. When the inter-electrode distance of the second capacitor is formed to be long, the dimensions of the entire substrate including the fixed electrode unit and moveable finger electrode must be large.

Therefore, there are problems in that the related art finds it difficult to appropriately set the inter-electrode distances between the fixed and moveable finger electrodes and finds it impossible to facilitate improvement in the detecting sensitivity while the substrate and the like are miniaturized.

SUMMARY OF THE INVENTION

The present invention is made in view of the problems of the foregoing related art. An object of the present invention is to increase the sensitivity of the capacitance-type external-force detecting device without unduly increasing the size of the device.

To this end, according to a first aspect of the present invention, there is provided an external-force detecting device comprising:

n fixed electrodes supported by said substrate, n being an integer greater than 1;

n moveable electrodes which are located at nominal positions relative to the fixed electrodes when they are at rest and are moveable in a detection direction in response to an external force applied thereto so as to vary the relative locations of the fixed and moveable electrodes;

n/2 electrode pairs, each electrode pair including a respective fixed electrode and a respective moveable electrode that together define a variable capacitance whose capacitance varies as a function of the distance therebetween, the electrode pairs being divided into first and second sets of electrode pairs, the fixed and moveable electrodes of the first set of electrode pairs being spaced from one another by a first inter-electrode distance when the moveable electrodes are in their stationary positions, the fixed and moveable electrodes of a second set of electrode pairs being spaced from one another by a second inter-electrode distance when the moveable electrodes are in their stationary positions, the dimension ratio of the first inter-electrode distance to the second inter-electrode distance falling within the range of 1:2 to 1:5; and a detector for detecting the displacement of the moveable electrodes relative to the fixed electrodes as a function of the variation in the overall capacitances of the first set of electrode pairs to the capacitances of the second set of electrode pairs resulting from movement of the moveable electrodes in response to an application of the external force.

When the capacitance-detecting unit outputs a voltage signal in accordance with the variation in the ratio of the overall capacitance of the first and second electrode pairs, the sensitivity per unit length can be maximized by setting the first and second inter-electrode distance to be within the range of 1:2 to 1:5. Hence, when, for example, the capacitance-detecting unit is constructed using a high input-impedance field-effect transistor, a high input-impedance operational amplifier, or the like, the dimension ratio of the first to the second inter-electrode distances, and the detecting sensitivity for the unit length in the detecting direction can be increased. As a result, even when the moveable electrodes are is displaced slightly in the detecting direction, since the voltage signal variation is large and the detecting sensitivity is increased. This makes it possible to decrease electrode distances and the sensor can be miniaturized while simultaneously improving its detecting sensitivity.

In the preferred embodiment, at least one of the moveable electrodes forms two separate electrode pairs with two different fixed electrodes and at least some of the fixed electrodes form two separate electrode pairs with two different moveable electrodes.

The fixed electrodes are preferably provided on the substrate and the movable electrodes are preferably supported by a movable platform which is supported on the substrate by at least one support beam.

In the preferred embodiment, the fixed electrodes are part of one or more fixed comb electrodes and the moveable electrodes are part of one or more comb electrodes. Finger electrodes of the fixed and moveable comb electrodes are interdigitated so as to form the various electrode pairs.

The capacitance-detecting unit may include a field-effect transistor for converting the variation in the ratio of the overall capacitances of the first and second sets of electrode pairs into a voltage signal and for outputting the converted voltage signal.

The detecting sensitivity per unit length in the detecting direction can be increased by forming ratio of the first and second inter-electrode distances to the second inter-electrode distance to be within a range of 1:2 to 1:5.

The capacitance-detecting unit may include, for example, a field effect transistor or an operational amplifier for converting the variation in the ratio of the overall capacitances between the first and second electrode pairs into a voltage signal and for outputting the converted voltage signal.

According to a second aspect of the present invention, a capacitance-type external-force detecting device includes an external force detecting device, comprising:

n fixed electrodes supported by said substrate, n being an integer greater than 1;

n moveable electrodes, the moveable electrodes being located at nominal positions relative to the fixed electrodes when they are at rest and being moveable in a detection direction in response to an external force applied thereto so as to vary the relative locations of the fixed and moveable electrodes;

n/2 electrode pairs, each electrode pair including a respective fixed electrode and a respective moveable electrode that together define a variable capacitance, whose capacitance varies as a function of the distance therefrom, the electrode pairs being divided into first and second sets of electrode pairs, the fixed and moveable electrodes of one half of the electrode pairs being spaced from one another by a first inter-electrode distance when the moveable electrodes are in their nominal positions, the fixed and moveable electrodes of a second set of electrode pairs being spaced from one another by a second inter-electrode distance when the moveable electrodes are in their nominal positions, the ratio of the first inter-electrode distance to the second inter-electrode distance falling within the range of 1:1.7 to 1:3.5; and a detector for detecting the displacement of the moveable electrodes relative to the fixed electrodes as a function of the variation in the magnitude of the overall capacitances between the electrode pairs.

When the capacitance-detecting unit outputs the voltage signal in accordance with the variation in the overall magnitude of capacitances between the electrode pairs, the dimension ratio of the first and second inter-electrode distances is constructed to be within a range of 1:1.7 to 1:3.5. Hence, when, for example, the capacitance-detecting unit is constructed to output the voltage signal substantially in proportion to the amount of variation in capacitance, the dimension ratio of the first inter-electrode distance to the second inter-electrode distance can be appropriately set between the fixed electrode unit and the moveable-side electrode unit, and the detecting sensitivity for the unit length in the detecting direction can be increased. As a result, since the inter-electrode distances and the like can be formed to be short while this detecting sensitivity for the external force can be maintained in a preferable manner, miniaturization of a device and the improvement in its detecting sensitivity can be compatible.

The comb-shaped fixed electrode units and the comb-shaped moveable-side electrode units may include a single crystal or a polycrystal of silicon material.

Since comb-shaped fixed and moveable-side electrodes can be constructed using a single crystal or polycrystal silicon material, for example, mere application of a fining process such as an etching process to the silicon material can simultaneously and effectively form these comb-shaped electrodes.

BRIEF DESCRIPTION OF THE DRAWINGS

Other features and advantages of the present invention will become apparent from the following description of the invention which refers to the accompanying drawings.

DESCRIPTION OF THE PREFERRED EMBODIMENTS

Referring now to the drawings wherein like numerals indicate like elements, there is shown in FIGS. 1–6 a first embodiment of the present invention designated generally as external force detecting device 1. In the disclosed embodiment, the external-force detecting device is applied, by way of example, to an angular velocity sensor.

Figure 1:
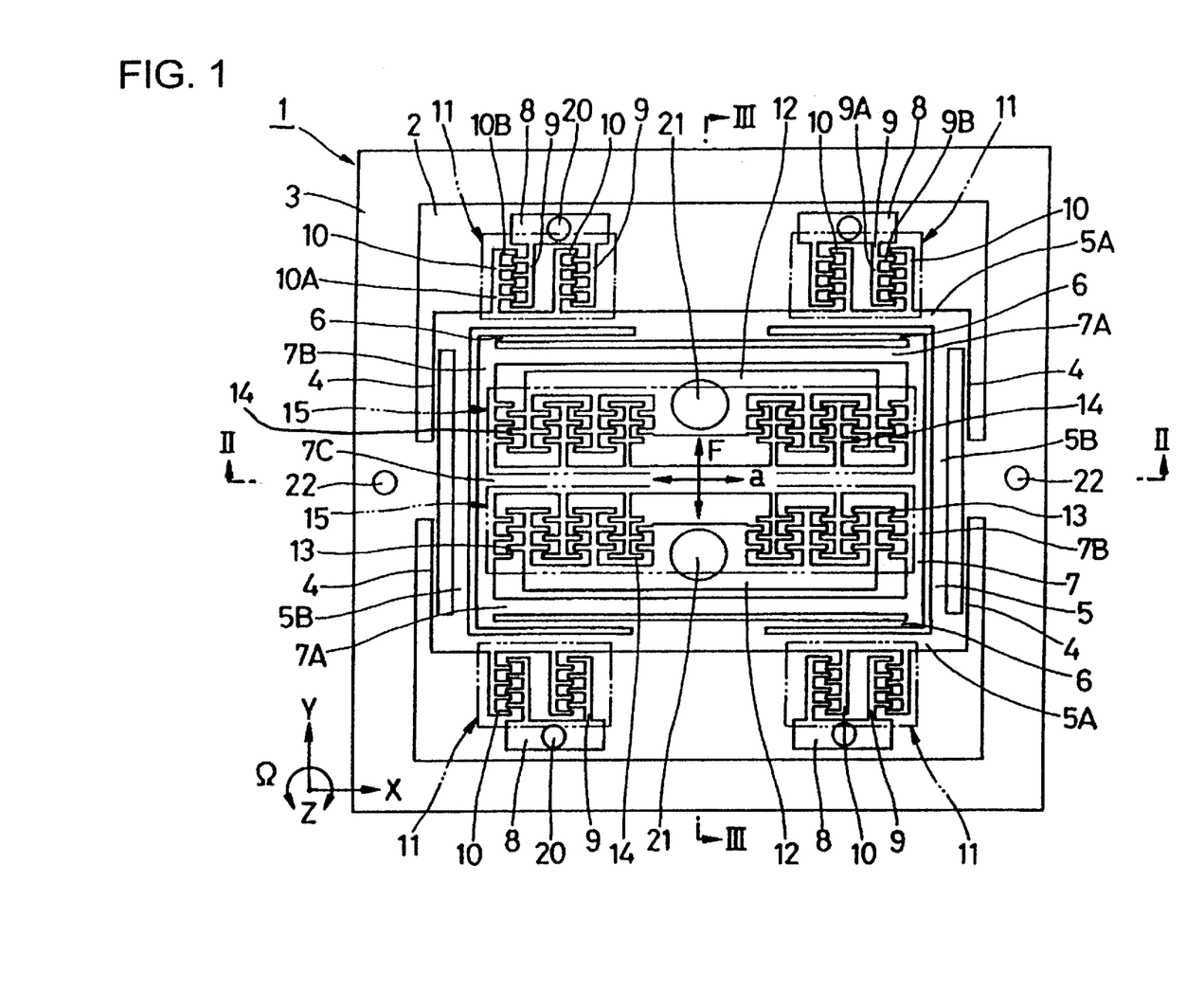
FIG. 1 is a plan view showing an angular velocity sensor according to a first embodiment of the present invention.
Figure 2:
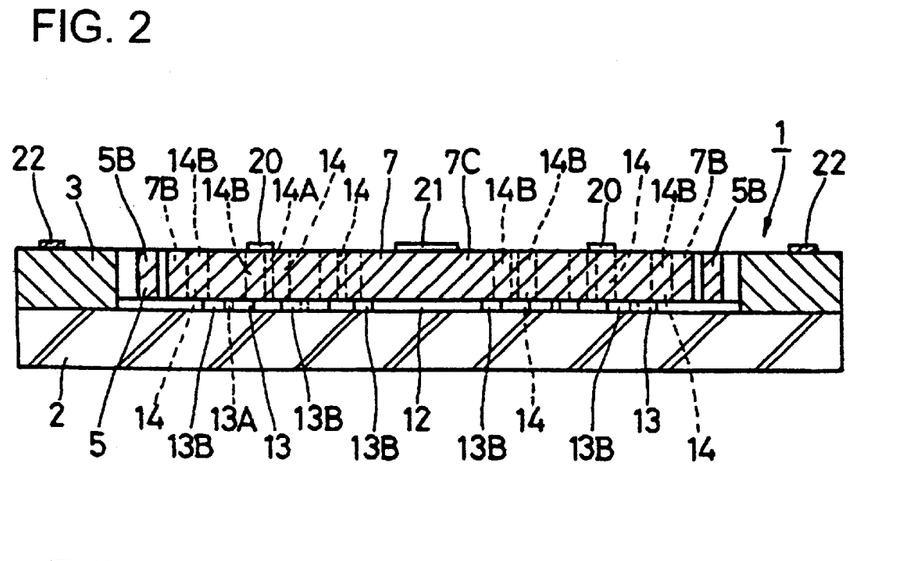
FIG. 2 is a cross-sectional view of the angular velocity sensor taken along arrow II—II in FIG. 1.
Figure 3:
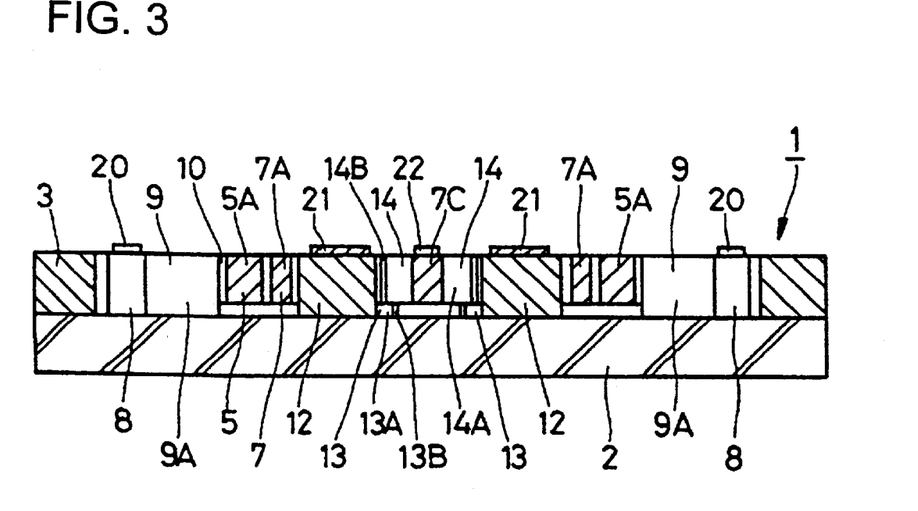
FIG. 3 is a cross-sectional view of the angular velocity sensor taken along arrow III—III in FIG. 1.

As shown in FIGS. 1 and 3, the substrate 2 is quadrangular in shape and is formed of a high resistance material such as silicon or glass.

A supporting unit 3, supporting beams 4 and 6, external vibrating body 5, internal vibrating body 7, comb electrodes 9 and 10 (used to vibrate the vibrating body 5 in the X-axis direction), and comb electrodes 13 and 14 (used to detect movement of the vibrating body 5 due to the application of an external force), and the like may be formed on the substrate 2 by providing on the substrate 2 a low resistance silicon material, for example, a single crystal or a polycrystal and processing it using a semiconductor process such as an etching process.

As best shown in FIGS. 1 and 3, supporting unit 3, which is fixedly disposed on the substrate 2, forms an extended quadrangular frame enclosing the external vibrating body 5 and the like.

Four external supporting beams 4 are provided between the internal region of the supporting unit 3 and the external vibrating body 5. Two external supporting beams 4 are disposed at respective opposite sides of the external vibrating body 5 with respect to the X-axis direction in FIG. 1 and extend in the Y-axis direction.

Reference numeral 5 indicates the external vibrating body supported inside the supporting unit 3 by each of the external supporting beams 4. The external vibrating body 5 forms a quadrangular shaped frame including a pair of horizontal frame parts 5A which face each other and extend in the X-axis direction and a pair of vertical frame parts 5B connected between the corresponding ends of the horizontal frame parts 5A and extending in the Y-axis direction. Each of the external supporting beams 4 supports the external vibrating body 5 so that the external vibrating body 5 can be displaced (vibrated) in the X-axis direction and is prevented from being displaced in the Y-axis direction in a state in which the external vibrating body 5 is spaced from the substrate 2.

Four internal supporting beams 6, provided inside the external vibrating body 5, are disposed at opposite sides of the internal vibrating body 7. A pair of internal supporting beams 6 are located on opposite sides of the vibrating body 7 with respect to the Y-axis direction and extend in the X-axis direction. The ends of the support beams 6 are connected to the internal vibrating body 7.

The internal vibrating body 7 operates as the moveable unit supported by each of the internal supporting beams 6 inside the external vibrating body 5. The internal vibrating body 7 preferably forms a substantially ladder shaped frame. The internal vibrating body 7 includes horizontal frame parts 7A facing each other and extending in the X-axis direction, vertical frame parts 7B connected between the corresponding ends of the horizontal frames 7A and extending in the Y-axis direction, and an intermediate frame part 7C provided extending in the X-axis direction between the horizontal frames 7A so that the intermediate frame part 7C establishes a connection between substantially the central regions of the vertical frame parts 7B. Each of the internal supporting beams 6 supports the internal vibrating body 7 so that the internal vibrating body 7 can be displaced in the Y-axis direction and is prevented from being displaced in the X-axis direction.

The internal vibrating body 7 is maintained in a state in which the vibration-generating units 11 cause the internal vibrating body 7 to vibrate, along with the external vibrating body 5, in the direction of arrow "a" (the X-axis direction) in FIG. 1. When an angular velocity is applied around the Z-axis in this vibrating state, exertion of a Coriolis force F in accordance with the magnitude of the angular velocity causes the internal vibrating body 7 to be displaced in the Y-axis direction (detecting direction). The detecting circuit 16, shown in FIG. 5, detects the amount of displacement of the internal vibrating body 7 in the Y-axis (detecting) direction as the variation in capacitances between the fixed detecting finger electrodes 13 and the moveable finger electrodes 14.

Reference numerals 8 indicate fixed electrode units fixedly provided on the substrate 2. A pair of the fixed electrode units 8 are displaced at each of the opposite sides of the external vibrating body 5 in the Y-axis direction.

Reference numerals 9 indicate fixed comb electrodes provided on the fixed electrode units 8. Each of the fixed comb electrodes 9 includes a column 9A extending from the fixed electrode unit 8 in the Y-axis direction and a plurality of fixed finger electrodes 9B projected in the X-axis direction from the column 9A and disposed in a comb-shaped manner so as to have spacing between the finger electrodes 9B in the Y-axis direction.

Reference numerals 10 indicate moveable comb electrodes corresponding to the fixed comb electrodes 9, each provided on the external vibrating body 5. Each of the moveable comb electrodes 10 includes a column 10A extending in the Y-axis direction from the horizontal frame part 5A of the external vibrating body 5 and a plurality of moveable finger electrodes 10B projecting in the X-axis direction from the column 10A in a comb-like manner.

Reference numerals 11 indicate the vibration-generating units provided between the substrate 2 and the external vibrating body 5. Each of the vibration-generating units 11 includes the fixed comb electrodes 9 and the moveable comb electrodes 10. The finger electrodes 9B and 10B are each spaced apart by substantially the same distance. By applying an alternating driving signal in between the fixed comb electrode 9 and the moveable comb electrode 10, the vibration-generating unit 11 alternately generates an electrostatic attraction between the finger electrodes 9B and 10B causing the external vibrating body 5 and the like to vibrate in the direction of arrow "a" (the X-axis direction) in FIG. 1.

Reference numerals 12 indicate two fixed detecting units fixedly provided on the substrate 2 and located inside the internal vibrating body 7. The fixed detecting units 12 are disposed at opposite sides of the intermediate frame part 7C of the internal vibrating body 7 with respect to the Y-axis direction and extend in the X-axis direction.

Figure 4:
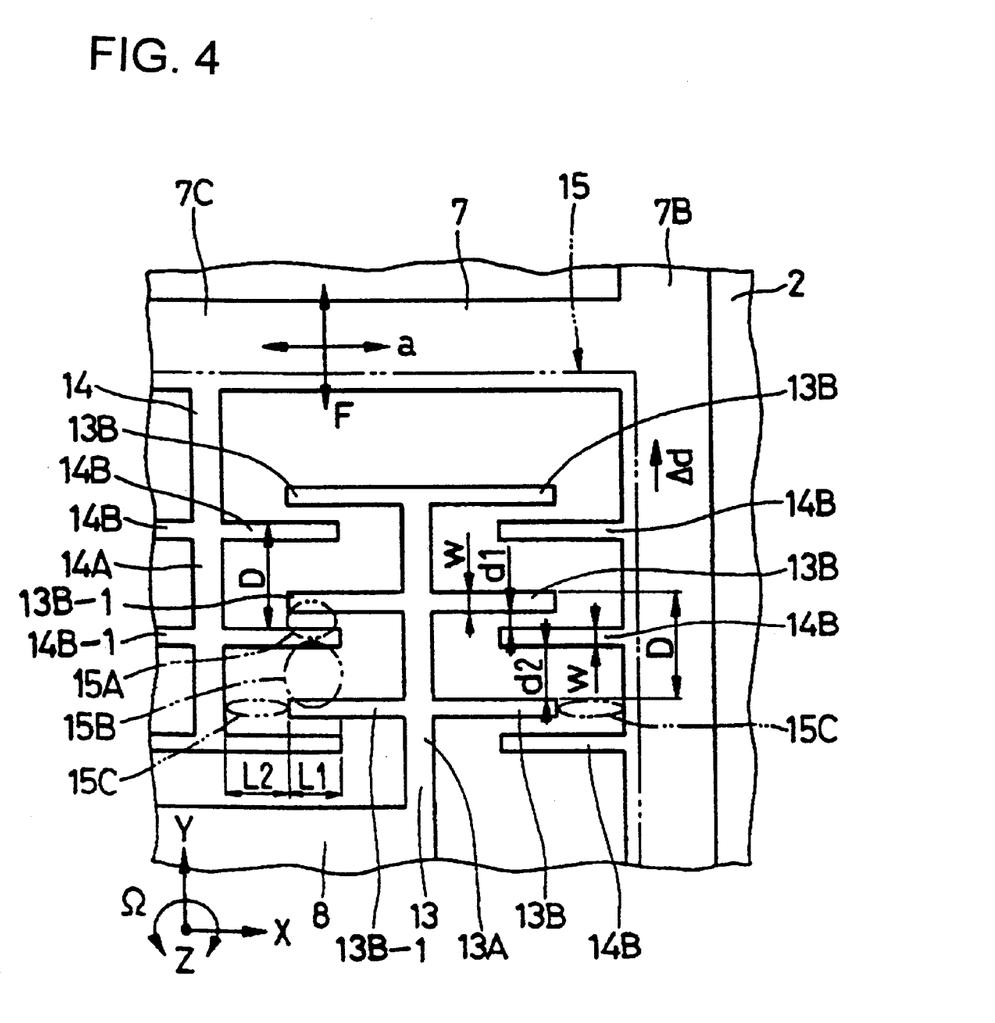
FIG. 4 is an important enlarged view obtained by enlarging a fixed electrode plate and a moveable-side electrode plate in FIG. 1.

Reference numerals 13 indicate fixed comb electrodes forming part of the fixed detecting units 12. As shown in FIG. 4, each of the fixed comb electrodes 13 includes a column 13A extending in the Y-axis direction from the body of the fixed detecting unit 12 and fixed finger electrodes 13B projecting from the column 13A in the X-axis direction. Some of the fixed finger electrodes are directly provided on the main body of the fixed detecting unit 12.

Each of the fixed finger electrodes 13B has substantially a predetermined length dimension with respect to the X-axis and a predetermined width dimension "w" of, for example, approximately 1 to 3 μm with respect to the Y-axis direction. Each of the finger electrodes 13B is disposed at a predetermined interval D with respect to the Y-axis, to form, in combination with column 13A, a comb-shaped array.

Reference numerals 14 indicate moveable comb electrodes each corresponding to a fixed comb electrode 13 provided on the internal vibrating body 7. Each of the moveable comb electrodes 14 includes a column 14A extending in the Y-axis direction from the intermediate frame unit 7C of the internal vibrating body 7 and moveable finger electrodes 14B projecting in the X-axis direction from the column 14A. Some of the moveable comb electrodes 14B are directly provided on the main body of the vertical frame part 7B of the internal vibrating body 7.

In substantially the same manner as with the fixed finger electrodes 13B, each of the moveable finger electrodes 14B is formed so as to have a predetermined length dimension and width dimension "w" and so as to be disposed at nominal intervals D with respect to the Y-axis when the finger electrodes 14B are stationary. Most of the moveable finger electrodes 14B are disposed between a pair of corresponding fixed finger electrodes 13B having spacing therebetween so as to be meshed with the corresponding fixed finger electrodes 13B. A pair of the fixed finger electrodes 13B is disposed between opposite sides of most of the moveable finger electrodes 14B in the detecting direction (the Y-axis direction).

The moveable finger electrodes 14B and one fixed finger electrode 13B of the pair of the fixed electrode plates 13B form a first inter-electrode distance d1 having a predetermined dimension of, for example, approximately 1 to 3 μm therebetween, and the same moveable finger electrode 14B and the other fixed finger electrode 13B form a second inter-electrode distance d2 therebetween. In the embodiment disclosed, the inter-electrode distance d1 is formed to be smaller than the inter-electrode distance d2 (d1<d2) and the dimension ratio of both (d1:d2) is preferably, but not necessarily, set to a ratio range of approximately d1:d2=1:2 to 1:5, as shown in the below-described expression 13.

Each moveable finger electrode 14B is disposed so as to overlap only the distal end of its adjacent fixed finger electrodes 133 corresponding to the dimension L1 in FIG. 4. The proximal end of the moveable finger electrode plate 14B and the column 13A of the fixed detecting electrode 13 are offset by a dimension L2 with respect to the X-axis. This dimension L2 is set in accordance with the below-described expression 15.

Figure 5:
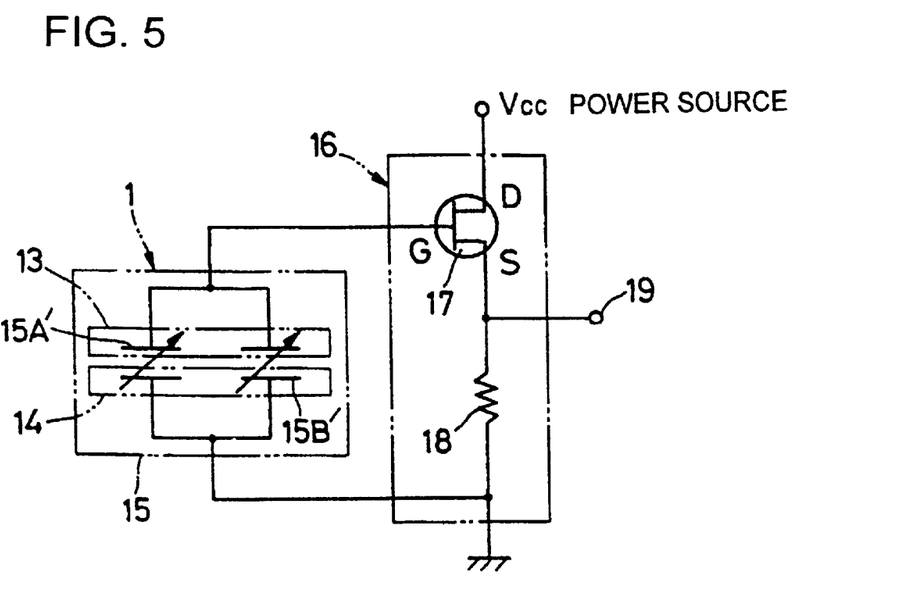
FIG. 5 is a circuit diagram in a state in which the angular velocity sensor is connected to the capacitance detecting circuit.

Reference numerals 15 indicates a pair of variable capacitance unit provided between the substrate 2 and the internal vibrating body 7. Each variable capacitance unit 15 comprises a plurality of first capacitors 15A and a plurality second capacitors 15B, each of which is defined by a respective pair of finger electrodes 13B, 14B. Two adjacent pairs of variable capacitors 15A, 15B are shown in FIG. 4. A first flat, parallel capacitor 15A is formed between the fixed finger electrode 13B-1 and the moveable electrode 143-1 and a second flat, parallel variable capacitor 15B is formed between the moveable electrode 14B-1 and the fixed finger electrode 13B-2. Similar capacitors 15A and 15B are formed between each respective pair of adjacent finger electrodes 13B, 14B. In the preferred embodiment, the various finger electrodes 13B, 14B form an equal number of capacitors 15A and 15B.

All of the individual capacitors 15A are connected in parallel to one another and define an equivalent electrode 15A' shown in FIG. 5. Similarly, all of the second capacitors 15B are connected in parallel to one another and form an equivalent capacitor 15B' shown in FIG. 5. These equivalent capacitors 15A' and 15B' are also connected in parallel to one another between ground and the gate electrode G of transistor 17. Since the individual capacitors 15A and 15B are connected in parallel with each other, the total capacitance between ground and the gate G of transistor 17 is equal to the sum of the individual capacitances of each of the individual variable capacitors 15A, 15B.

When the angular velocity around the Z-axis causes the internal vibrating body 7 to be displaced in the Y-axis direction, the moveable finger electrodes 14B are displaced in the Y-axis direction with respect to the fixed finger electrodes 13B. This varies the overall capacitance of the capacitors 15A and 15B (and therefore of the equivalent capacitors 15A' and 15B'). This variation can be detected to indicate the angular velocity.

Referring to FIG. 5, reference numeral 16 indicates the detecting circuit (as a capacitance-detecting unit) connected to the angular velocity sensor 1. The detecting circuit 16 preferably includes a transistor 17 formed having high input impedance, such as a field-effect transistor (FET), and a resistor 18.

As described below, the detecting circuit 16 detects the variation in overall capacitance of the variable capacitor unit 15, and outputs a voltage signal from an output terminal 19 which is substantially proportional to the variation ratio (ΔC/C) in the overall capacitance thereof. The voltage signal is a detecting signal indicating angular velocity.

In FIG. 1, reference numerals 20 indicate electrode pads for connecting each of the fixed comb electrodes 9 of the vibration generating units 11 to the outside, reference numerals 21 indicate the electrode pads for connecting each of the fixed comb electrodes 13 of the fixed detecting units 12 to the outside, and reference numerals 22 indicate the electrode pads for individually connecting both the moveable comb electrodes 10 of the vibration generating units 11 and the moveable comb electrodes 14 to the outside. The electrode pads 20, 21, and 22 are provided on the fixed electrode units 8, the fixed detecting units 12, and the supporting units 3, respectively.

The external-force detecting device according to the present embodiment preferably includes the above-described construction. Next, the operation of this structure is described.

When alternating driving signals having opposite phases are each applied to the vibration-generating units 11, electrostatic attractions are alternately generated between the fixed vibrating electrodes 9 on the left and on the right and the moveable vibrating electrodes 10. This causes the external vibrating body 5 to vibrate along with the internal vibrating body 7 in the direction of arrow "a" in FIG. 1.

When an angular velocity Q around the Z-axis is applied to the angular velocity sensor 1 during this vibration state, since the Coriolis force F (inertia force) shown in the following expression 1 is applied to the vibrating bodies 5 and 7 with respect to the Y-axis, the Coriolis force F displaces the internal vibrating body 7 in the Y-axis direction in accordance with the following expression 1:

$$F = 2m\Omega v \quad \text{[expression 1]}$$

where m: the mass of the internal vibrating body 7, Ω is the angular velocity around the Y-axis, and v is the velocity in the X-axis direction of the internal vibrating body 7.

When the internal vibrating body 7 is displaced in the Y-axis direction, the moveable finger electrodes 14B of the moveable comb electrodes 14 are displaced in the Y-axis direction with respect to the fixed finger electrodes 13B of the fixed comb electrodes 13. This varies the inter-electrode distances d1 and d2 (capacitances) of the capacitors 15A and 15B in accordance with the degree of displacement. The detecting circuit 16 detects the variation in overall capacitance of the capacitors 15A and 15B as the angular velocity Ω, and outputs a voltage signal having a voltage value corresponding to this angular velocity Ω from the output terminal 20.

The relationship between the displacement of the moveable finger electrodes 14B to the voltage signal output by detector 16 will now be described with reference to the capacitance of two individual, parallel connected, capacitors 15A and 15B. However, this analysis is accurate for the equivalent capacitors 15A' and 15B' defined by the two sets of first capacitors 15A and second capacitors 15B.

In a state in which the angular velocity (Coriolis force F) does not causes the moveable finger electrodes 14B to be displaced in the Y-axis direction, the inter-electrode distances d1 and d2 of the capacitors 15A and 15B, respectively, of the variable capacitance unit 15 are maintained at their nominal positions as shown in FIG. 4. At this time, the capacitances C1 and C2 of the capacitors 15A and 15B, respectively, can be expressed with the following expression 2.

$$\left. \begin{array}{l} C1 = \dfrac{\varepsilon S}{d1} \\ C2 = \dfrac{\varepsilon S}{d2} \end{array} \right\} \quad \text{[expression 2]}$$

where di is the inter-electrode distance of the capacitor 15A, d2 is the inter-electrode distance of the capacitors 15B, S is the facing area of the electrodes 13B and 14B, and ε is the dielectric constant.

The overall capacitance C of the capacitors 15A and 15B detected by the detecting circuit 16 is computed using the expression 2 as shown in the following the expression 3.

$$C = C1 + C2 = \frac{\varepsilon S}{d1} + \frac{\varepsilon S}{d2} \quad \text{[expression 3]}$$

When the angular velocity (Coriolis force F) causes the moveable finger electrodes 14B to be displaced by a small displacement amount Δd in the Y-axis direction in FIG. 4 from this nominal position, the inter-electrode distance of the capacitor 15A is (d1−Δd) and that of the capacitor 15B is (d2+Δd). Accordingly, the overall capacitance $C_d$ of the parallel capacitors 15A and 15B is given by the following expression 4.

$$Cd = \frac{\varepsilon S}{d1 - \Delta d} + \frac{\varepsilon S}{d2 + \Delta d} \quad \text{[expression 4]}$$

As a result, when the moveable finger electrode 14B is displaced by the small amount of displacement Δd, the variation ΔC (=$C_d$−C) in the overall capacitance of the capacitors 15A and 15B can be expressed in the following expression 5 using the expressions 3 and 4.

$$\begin{aligned} \Delta C &= \frac{\varepsilon S}{d1 - \Delta d} + \frac{\varepsilon S}{d2 + \Delta d} - \left( \frac{\varepsilon S}{d1} + \frac{\varepsilon S}{d2} \right) \\ &= \varepsilon S \left\{ \left( \frac{1}{d1 - \Delta d} - \frac{1}{d1} \right) + \left( \frac{1}{d2 + \Delta d} - \frac{1}{d2} \right) \right\} \\ &\approx \varepsilon S \Delta d \left( \frac{1}{d1^2} - \frac{1}{d2^2} \right) \end{aligned} \quad \text{[expression 5]}$$

The transistor 17 and other elements of the detecting circuit 16 convert the variation ΔC in the overall capacitance $C_d$ into a voltage variation ΔV and output the converted voltage variation ΔV as a voltage signal. In this case, in the transistor 17 such as the FET, the voltage variation ΔV in the voltage signal is substantially proportional to the variation ratio of the capacitance (ΔC/C) as indicated in the following expression 6.

$$\Delta V = \frac{\Delta C}{C} V0 \quad \text{[expression 6]}$$

where V0 is the reference voltage of the voltage signal, ΔV is the voltage variation in voltage signal, C is the initial capacitance, and ΔC is the variation in overall capacitance.

Substitution of the expressions 3 and 5 into this expression 6 yields the following expression 7 in which the voltage variation ΔV in the voltage signal can be expressed as a function of the inter-electrode distances d1, d2.

$$\Delta V = \Delta dV0 \frac{d2 - d1}{d1\ d2} \qquad \text{[expression 7]}$$

Therefore, if the difference between the inter-electrode distances d1 and d2 is increased, the voltage variation ΔV in the voltage signal is increased and the detecting sensitivity is improved. However, when an attempt is made to set the difference between the inter-electrode distances d1 and d2 too great, the dimensions of the angular velocity sensor 1 must be great with respect to the detecting direction (Y-axis direction).

In the present embodiment, the dimension ratio of the inter-electrode distance d1 to the inter-electrode distance d2 is set to maximize the detecting sensitivity (ΔV/D) per unit length with respect to the detecting direction for a pair of fixed finger electrodes 13B disposed at every dimension D between the moveable finger electrodes 14B.

As is indicated in FIG. 4, the dimension D between adjacent fixed finger electrodes 13B is given by the following expression 8 using the width dimension w and the inter-electrode distances d1 and d2 of the electrode plates 13B and 14B.

$$D = d1 + d2 + 2w \qquad \text{[expression 8]}$$

The following expression 9 is obtained when the detecting sensitivity (ΔV/D) for the unit length is computed using the expressions 7 and 8.

$$\frac{\Delta V}{D} = \frac{(d2 - d1)\Delta dV0}{d1\ d2(d1 + d2 + 2w)} \qquad \text{[expression 9]}$$

In order to minimize the dimension in the detecting direction, when the width dimension w and the nominal first inter-electrode distance d1 of the finger electrodes 13B and 14B in their stationary state are formed so as to have the same dimensions (namely, w=d1) as the minimum dimensions with which they can be formed by means of, for example, the etching process, the following expression 10 can be obtained using the expression 9.

$$\frac{\Delta V}{D} = \frac{(d2 - d1)\Delta dV0}{d1\ d2(3d1 + d2)} = \frac{\frac{d1}{d2}\left(1 - \frac{d1}{d2}\right)\Delta dV0}{\left(3\frac{d1}{d2} + 1\right)d1^2} \qquad \text{[expression 10]}$$

Here, as shown in the following expression 11, (d1/d2) of this expression 10 is substituted with the ratio X.

$$X = \frac{d1}{d2} \qquad \text{[expression 11]}$$

The expression 10 can be substituted as shown in the following expression 12.

$$\frac{\Delta V}{D} = K\frac{X(1 - X)}{3X + 1} \qquad \text{[expression 12]}$$

$$\text{where } K = \frac{\Delta dV0}{d1^2}$$

Figure 6:
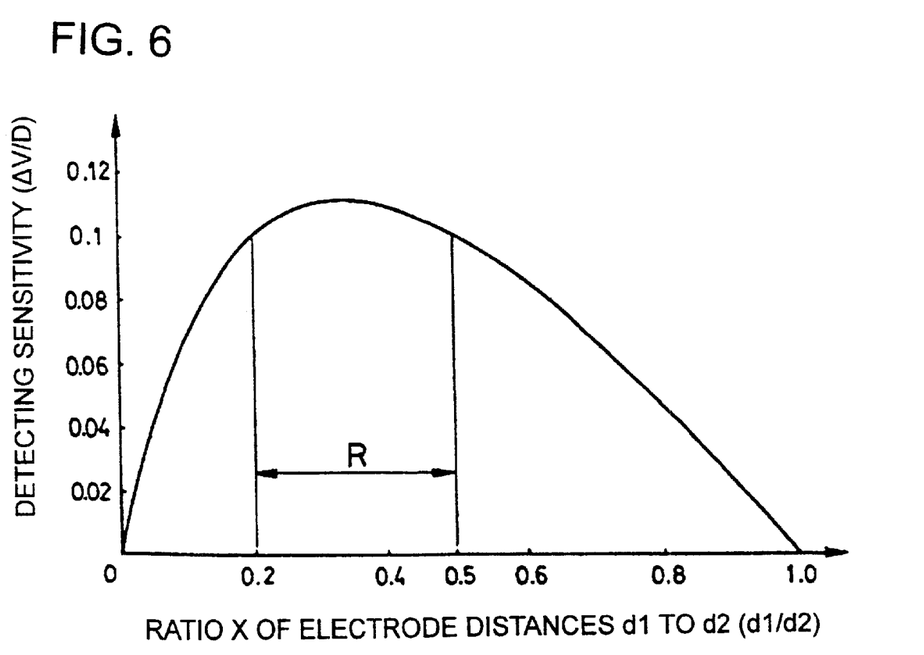
FIG. 6 is a characteristic diagram showing the relationship between the dimension ratio of a first inter-electrode distance to a second inter-electrode distance and the detecting sensitivity of an angular velocity.

As a result, a characteristic curve representing the relationship between the ratio X and the detecting sensitivity per unit length (ΔV/D) based on the expression 12 is shown in FIG. 6. As shown therein, the detecting sensitivity (ΔV/D) per unit length becomes large when the ratio X is within a range R of approximately 0.2 to 0.5. This ratio range R is equal to the following expression 13.

$$d1:d2 = 1:2 \text{ to } 1:5 \qquad \text{[expression 13]}$$

Therefore, by forming the dimension ratio of the inter-electrode distance d1 to d2 based on the expression 13, the detecting sensitivity (ΔV/D) per unit length in the detecting direction can be maximized. In addition, the detecting sensitivity can be improved while the angular velocity sensor 1 is miniaturized in the detecting direction.

On the other hand, as shown in FIG. 4, a parasitic capacitor 15C having an inter-electrode distance of a dimension L2 in the X-axis direction is formed between the end face of the moveable finger electrode 14 and the column 13A of the fixed finger electrode 13. When the angular velocity sensor 1 is operated, there is a risk that vibration of the moveable finger electrode 14 in the X-axis direction causes the amount of variation in capacitance of this parasitic capacitor 15C to become noise, adversely affecting the variation ΔC in capacitance on the sides of the capacitors 15A and 15B.

In this case, the amount of variation ΔCX at a time when the capacitance of the parasitic capacitor 15C is varied due to vibration of the moveable finger electrodes 14B or the like can be computed, as shown in the following expression 14, using a facing area ST between the end face of the moveable finger electrode 14 and the column 13A of the fixed comb electrode 13, the dimension L2 between these, and an amplitude A of the moveable electrodes 14B with respect to the X-axis direction, $$\Delta CX = \varepsilon ST\left(\frac{1}{L2 - A} - \frac{1}{L2}\right) \approx \frac{\varepsilon ST}{L2}\left\{\frac{A}{L2} + \left(\frac{A}{L2}\right)^2\right\} \qquad \text{[expression 14]}$$

Here, by forming the parasitic capacitors 15C on opposite sides of the vibrating direction so that the column 14A of the moveable finger electrode 14 is sandwiched (as shown in FIG. 4), the first term (A/L2) of the rightmost side of the expression 14 is counterbalanced between the two capacitors 15C on opposite sides of the column 13A. Since the second term $(A/L2)^2$ is transmitted to the detecting circuit 16 as a frequency signal having twice the vibration frequency, an error occurs in the voltage signal.

However, in the present embodiment, as shown in the following expression 15, the dimension L2 of the capacitor 15C is formed to be, for example, approximately five times the amplitude A or more based on experimental data and the like.

$$L2 \geq 5A \qquad \text{[expression 15]}$$

This enables the amount of variation ΔCX in capacitance of the capacitor 15C side to be decreased to much smaller than the amount of variation in capacitance of the capacitor 15A and 15B sides, whereby the detecting accuracy can be improved.

Thus, an angular velocity sensor which uses a detecting circuit for detecting the displacement of the moveable electrodes relative to the fixed electrodes as a function of the variation in the ratio of the overall capacitance of the first and second sets of electrode pairs resulting from the movement of the moveable electrodes in response to the application of the external force will exhibit greater sensitivity if the dimension ratio (d1:d2) of the inter-electrode distance d1 to d2 is formed so as to be within a range of 1:2 to 1:5.

This enables the detecting sensitivity (ΔV/D) per unit length between the fixed comb electrode 13 and the moveable comb electrode 14 in the detecting direction to be maximized. Even when the moveable comb electrodes 14 is moved by a small amount Δd, the voltage signal generated by detecting circuit 16 is varied by a large amount ΔV.

Therefore, while the detecting sensitivity of the angular velocity sensor 1 can be improved, the dimension D between the electrode plates 13B and the like can remain relatively small while maintaining the desired detecting sensitivity. Hence, by appropriately designing the dimension ratio of the inter-electrode distance d1 to d2, it is possible to miniaturize the size of angular velocity sensor 1 and maximize the sensor sensitivity.

The electrodes 9, 10, 13, 14, and the like are preferably, but not necessarily, formed using a low-resistance silicon material constituting, for example, a single crystal or a polycrystal. Accordingly, by simply applying a fining process, such as the etching process, to the silicon material fixed on the substrate 2 by means of, for example, anodic bonding, the comb-shaped electrodes 9, 10, 13, 14, and the like can be simultaneously and effectively formed.

Figure 7:
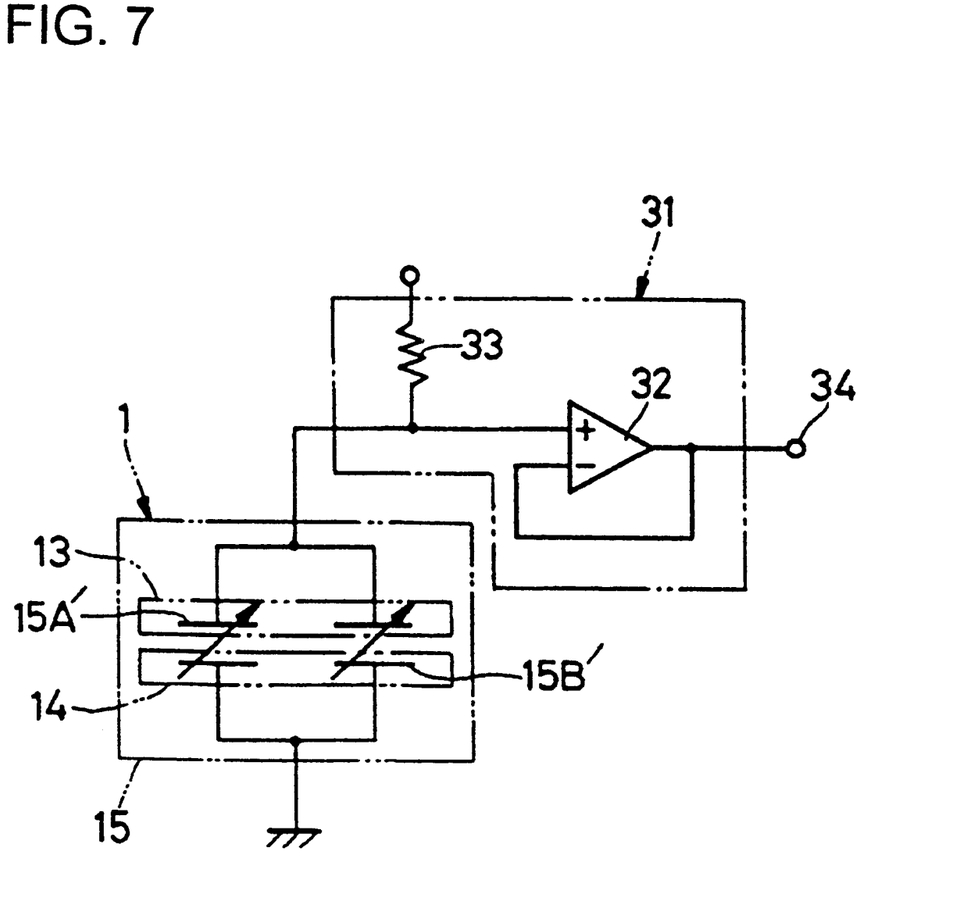
FIG. 7 is a circuit diagram showing a capacitance detecting circuit according a second embodiment of the present invention.

Next, a second embodiment according to the present invention is described with reference to FIG. 7. This embodiment is characterized in that an operational amplifier is formed to be used as the capacitance-detecting unit. In this embodiment, components which are identical to corresponding components in the first embodiment have the same reference numerals, so that the repeated-descriptions thereof are omitted.

Reference numeral 31 indicates the detecting circuit which is connected to the angular velocity sensor 1. The detecting circuit 31 includes, for example, an operational amplifier 32 serving as the capacitance-detecting unit having high input impedance and a resistor 33. The capacitors 15A and 15B of the angular velocity sensor 1 are connected in parallel with the input side of the operational amplifier 32.

In substantially the same manner as in the first embodiment, the detecting circuit 31 detects the variation in overall capacitance of the capacitors 15A and 15B when the internal vibrating body 7 of the angular velocity sensor 1 is displaced by the external force, and outputs the voltage signal substantially in proportion to the variation ratio (ΔC/C) of capacitance as the detecting signal of the angular velocity from an output terminal 34 to the outside.

Thus, in the present embodiment constructed in this manner as well, substantially the same effect as in the first embodiment can be obtained. That is, when the detecting circuit 31 including the operational amplifier 32 is used as well, by forming the dimension ratio (d1:d2) of the inter-electrode distance d1 to d2 of the angular velocity sensor 1 to be within a range of, for example, 1:2 to 1:5, the detecting sensitivity can be improved while the sensor can be miniaturized.

Figure 8:
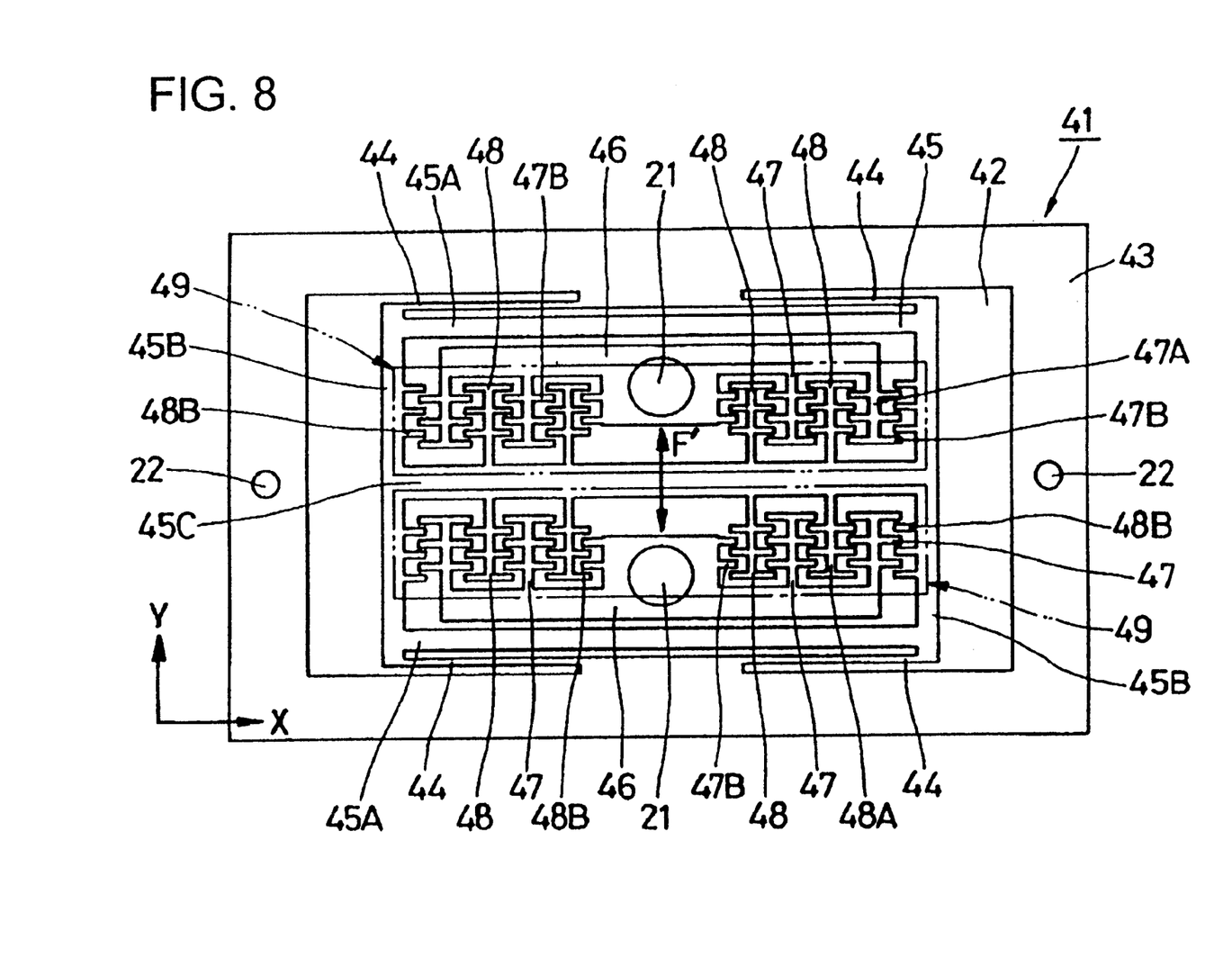
FIG. 8 is a plan view showing an acceleration sensor according to a third embodiment of the present invention.

Next, a third embodiment according to the present invention is described with reference to FIGS. 8 and 11. This embodiment is characterized in that the capacitance-type external-force detecting device is arranged to be applied to an acceleration sensor. In this embodiment, components which are identical to corresponding components in the first embodiment have the same reference numerals, so that the repeated-descriptions thereof are omitted.

Reference numeral 41 indicates the acceleration sensor and reference numeral 42 indicates the substrate constituting the main part of the acceleration sensor 41. In substantially the same manner as in the first embodiment, the substrate 42 is formed to be quadrangular in shape using, for example, a high-resistance silicon material or a high-resistance glass material. The below-described supporting unit 43, supporting beams 44, mass body 45, detecting electrodes 47 and 48, and the like are formed on the substrate 42 by applying the fining process such as the etching process to, for example, a low-resistance silicon material forming the single crystal or the polycrystal.

Reference numeral 43 indicates the supporting unit fixedly provided on the substrate 42. The supporting unit 43 is formed having an extended quadrangular frame so as to encircle the mass body 45 and the like.

Reference numerals 44 indicate the four supporting beams provided between the internal region of the supporting unit 43 and the mass body 45. Each of the supporting beams 44 is disposed at opposite sides of the mass body 45, two for each side with respect to the Y-axis direction in FIG. 8, so that the mass body 45 is sandwiched by these beams and extends in the X-axis direction.

Reference numeral 45 indicates the mass body serving as the moveable unit supported by the each of the supporting beams 44 in the supporting unit 43. The mass body 45 is formed to have substantially a ladder shaped frame in substantially the same manner as the internal vibrating body 7 in the first embodiment. The frame includes horizontal frame units 45A, vertical frame units 45B, and an intermediate frame unit 45C. Each of the supporting beams 44 supports the mass body 45 so that the mass body 45 can be displaced in the Y-axis direction and so that the mass body 45 can be prevented from being displaced in the X-axis direction.

By applying acceleration to the mass body 45 in the Y-axis direction (detecting direction), the inertia force F causes the mass body 45 to be displaced in the Y-axis direction. At this time, a detecting circuit 50 shown in FIG. 10 detects the amount of displacement as the variation in capacitance between the fixed comb electrodes 47 and the moveable comb electrode 48.

Reference numerals 46 indicate two fixed detecting units located inside the mass body 45 and fixedly provided on the substrate 2. Each of the fixed detecting units 46 is disposed at opposite sides of the intermediate frame unit 45C of the mass body 45 with respect to the Y-axis direction so that the intermediate frame 45C is sandwiched, and is extended in the X-axis direction.

Figure 9:
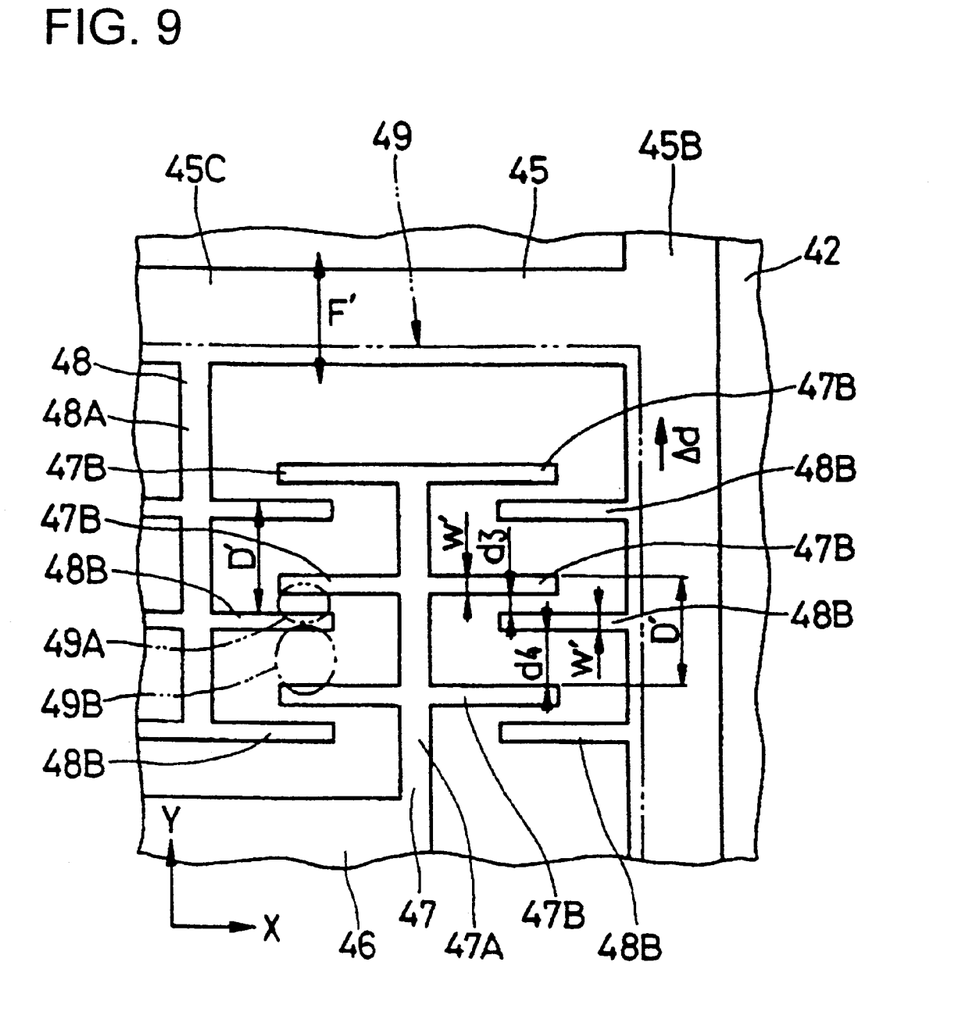
FIG. 9 is an important enlarged view obtained by enlarging the fixed electrode plate and the moveable-side electrode plate in FIG. 8.

Reference numerals 47 indicate a plurality of fixed comb electrodes provided on each of the fixed detecting units 46. As shown in FIG. 9, in substantially the same manner as in the first embodiment, each of the fixed comb electrodes 47 includes a fixed column 47A which extends in the Y-axis direction from the fixed detecting electrode unit 46 and a plurality of fixed finger electrodes 47B, projected in the X-axis direction from the column 47A. Some of the fixed finger electrodes 47B are directly disposed on the main body of the fixed detecting units 46. Each of the fixed finger electrodes 47B is formed to have a predetermined width dimension w' of, for example, approximately 1 to 3 μm. The fixed finger electrodes 47B are disposed at fixed intervals D' in the Y-axis direction.

Reference numerals 48 indicate a plurality of moveable comb electrodes provided on the mass body 45 so as to correspond to (and be interdigitated with) the fixed comb electrodes 47. Each of the moveable comb electrodes 48 includes a moveable column 48A extended in the Y-axis direction from the intermediate frame part 45C of the mass body 45 and a plurality of moveable finger electrodes 48B which project in the X-axis direction from the column 48A. Some of the moveable finger electrodes 48B are directly disposed on the vertical frames 45B of the mass body 45.

In substantially the same manner as in the first embodiment, each of the moveable finger electrodes 48B is formed to have the width dimension w' and is disposed at fixed intervals D' in the Y-axis direction. Each of the moveable finger electrodes 48B and each of the fixed finger electrodes 47B are disposed so as to be meshed with each other having a space therebetween so as to form a first plurality of capacitors 49A and a second plurality of capacitors 49B.

Like the first embodiment, a plurality of flat parallel capacitors 49A are formed between an adjacent pair of single electrodes 47B and 48B which are spaced apart by a distance d3. Like the first embodiment, a plurality of second flat parallel capacitors 49B are formed between adjacent pairs of finger electrodes 47B, 48B which are spaced apart by a distance d4. In the preferred embodiment, there are an equal number of first capacitors 49A and second capacitors 49B. All of the first capacitors 49A are connected in parallel and define a first equivalent capacitor 49A' shown in FIG. 10. All of the second capacitors 49B are connected in parallel and define an equivalent capacitor 49B' illustrated in FIG. 10. The equivalent capacitors 49A' and 49B' are in turn connected together between the voltage source 51 and the operational amplifier 52.

In this third embodiment, the dimensional ratio of the inter-electrode distance d3 to that of the inter-electrode distance d4 (d3:d4) is preferably set in advance to be within a ratio range of, for example, approximately d3:d4=1:1.7 to 1:3.5, as shown in expression 23 corresponding to the specifications of the below-described detecting circuit 50.

Reference numerals 49 indicate two variable capacitance units provided between the substrate 42 and the mass body 45. Each of the variable capacitance units 49 includes a respective set of the fixed comb electrodes 47 and a respective set of moveable comb electrodes 48, as shown in FIGS. 8 and 9.

When the acceleration (inertia force F') in the Y-axis direction causes the mass body 45 to be displaced, the displacement of the moveable finger electrodes 48B in the Y-axis direction with respect to the fixed finger electrodes 47B causes a variation in overall capacitance of the equivalent capacitors 49A' and 49B' which is detected as the acceleration.

Figure 10:
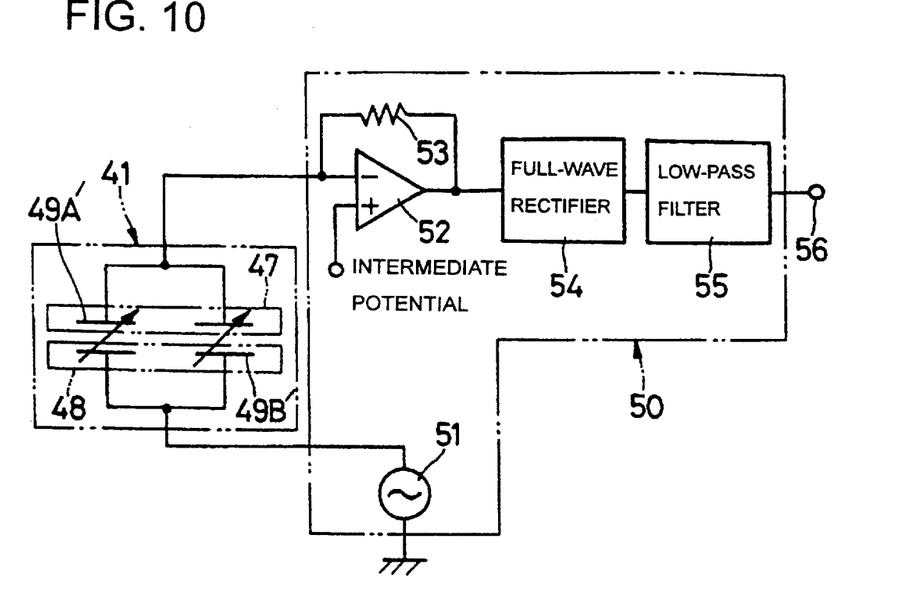
FIG. 10 is a circuit diagram in a state in which the acceleration sensor is connected to the capacitance detecting circuit.

Referring now to FIG. 10, reference numeral 50 indicates the detecting circuit serving as the capacitance-detecting unit connected to the acceleration sensor 41. The detecting circuit 50 includes an oscillator 51, an operation amplifier 52, a resistor 53, a full-wave rectifier 54, and a low-pass filter 55. The operational amplifier 52, along with the capacitors 49A and 49B, constitutes a differentiating circuit.

When the acceleration sensor 41 is operated, a sine wave is generated by the oscillator 51. The operational amplifier 52 amplifies the sine wave by an amount which varies as a function of the varying capacitances of the equivalent capacitors 49A' and 49B'. The output of the operational amplifier 52 is converted into a direct-current voltage corresponding to the capacitances of the equivalent capacitors 49A' and 49B' by the full-wave rectifier 54 and the low-pass filter 55.

Therefore, the detecting circuit 50 detects the variation in overall capacitance of the equivalent capacitors 49A' and 49B' and outputs a detection signal (a voltage signal) to the output terminal 56 which is substantially proportional to the amount of variation $\Delta C'$ in the below-described capacitance.

The external-force detecting device according to the present embodiment has the above-described construction. In a case in which the detecting circuit 50 is used, the relationship between the amount of displacement of the moveable finger electrodes 48B and the voltage signal is described. In the following description, it is assumed that there is only one pair of capacitors 49A, 49B. However, since the individual capacitors 49A are connected in parallel and the individual capacitors 49B are connected in parallel, this analysis remains true for the overall equivalent capacitors 49A' and 49B', respectively.

When the acceleration causes the moveable finger electrodes 48B to be displaced by the small amount $\Delta d$ in the Y-axis direction in FIG. 4, the amount of variation $\Delta C'$ in capacitances of the equivalent capacitors 49A and 49B is given by the following expression 16 by substituting the inter-electrode distances d1 and d2 in the expression 5 used in the first embodiment with the inter-electrode distances d3 and d4.

$$\Delta C' \approx \varepsilon S \Delta d \left( \frac{1}{d3^2} - \frac{1}{d4^2} \right) \quad \text{[expression 16]}$$

The detecting circuit 50 converts the amount of variation $\Delta C'$ in this capacitance into a voltage variation $\Delta V'$ and outputs the converted voltage variation as the voltage signal. In this case, in the detecting circuit 50, as is indicated with the following expression 17, the voltage variation $\Delta V'$ of the voltage signal is substantially proportional to the variation $\Delta C'$ in capacitance.

$$\Delta V' = k \Delta C' \quad \text{[expression 17]}$$

where k is the ratio coefficient.

In substantially the same manner as in the first embodiment, the dimension D' between the fixed finger electrodes 47B is given by the following expression 18 using the width dimension w' of the finger electrodes 47B and 48B and electrode distances d3 and d4.

$$D' = d3 + d4 + 2w' \quad \text{[expression 18]}$$

As a result, the detecting sensitivity ($\Delta V'/D'$) per unit length in the detecting direction is computed using the expressions 16 to 18, as shown in the following expression 19.

$$\frac{\Delta V'}{D'} = \frac{k \varepsilon S \Delta d \left( \frac{1}{d3^2} - \frac{1}{d4^2} \right)}{d3 + d4 + 2w'} \quad \text{[expression 19]}$$

The following expression 20 can be obtained with the substitution w'=d3 so that the first inter-electrode distance d3 and the width dimension w' of the electrode plates 13B and 14B are formed having the same dimension in the same manner as in the first embodiment.

$$\frac{\Delta V'}{D'} = \frac{\frac{d3}{d4}\left(1 - \frac{d3^2}{d4^2}\right) k \varepsilon S \Delta d}{\left(3\frac{d3}{d4} + 1\right) d3^2} \quad \text{[expression 20]}$$

By substituting (d3/d4) of the expression 20 with the ratio X, the following expression is obtained.

$$X = \frac{d3}{d4} \quad \text{[expression 21]}$$

The above expression 20 can be rewritten into the following expression 22.

$$\frac{\Delta V'}{D'} = K' \frac{X(1-X^2)}{3X+1} \qquad \text{[expression 22]}$$

$$\text{where } K' = \frac{k\varepsilon S \Delta d}{d3^3}.$$

Figure 11:
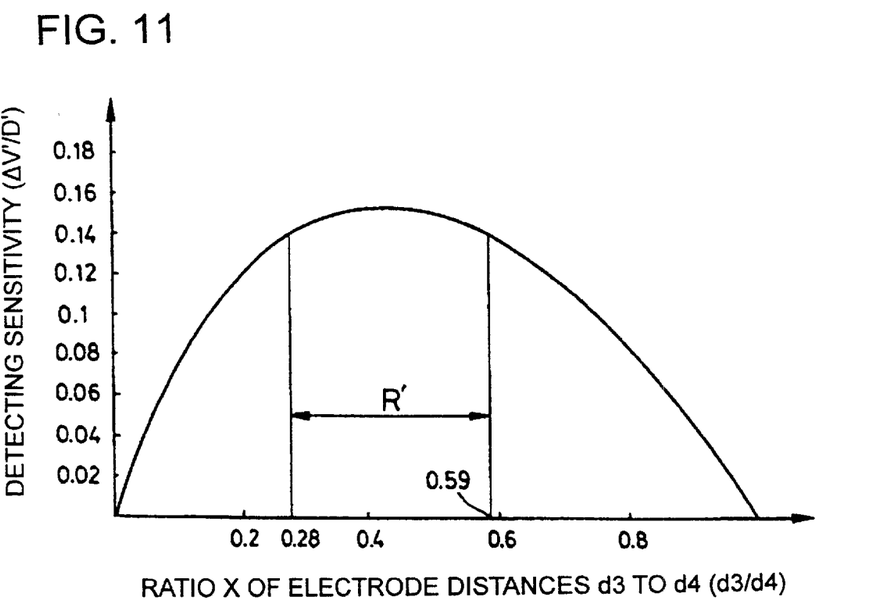
FIG. 11 is a characteristic diagram showing the relationship between the dimension ratio of the first inter-electrode distance to the second inter-electrode distance and the detecting sensitivity of the acceleration.

As a result of this, the characteristic curve representing the relationship between the ratio X and the detecting sensitivity per unit length ($\Delta V'/D'$) based on the expression 22 is shown in FIG. 11. As is seen from FIG. 11, the detecting sensitivity ($\Delta V'/D'$) for the unit length is maximized in a ratio range R' in which the ratio X is, for example, approximately 0.28 to 0.59. This ratio range R' is equal to the following expression.

$$d3:d4=1:1.7 \text{ to } 1:3.5 \qquad \text{[expression 23]}$$

Thus, an angular velocity sensor which uses a detecting circuit for detecting the displacement of the moveable electrodes relative to the fixed electrodes as a function of the variation in the magnitude of the overall capacitance of the electrode pairs resulting from movement of the moveable electrodes in response to the application of an external force will exhibit greater detecting sensitivity if the dimension ratio (d1:d2) of the inter-electrode distances d1 to d2 is formed to be within the range 1:1.7 to 1:3.5.

The mass body 45 of the acceleration sensor 41 often displaces (vibrates) at a lower frequency than the vibrating bodies 5 and 7 of the angular velocity sensor 1 in the first embodiment. Since the detecting circuit 50 has a construction in which the detecting circuit 50 can detect the variation in capacitance at a low frequency more accurately than the detecting circuits 16 and 31 in the first embodiment, the combination of the acceleration sensor 41 and the detecting circuit 50 can improve the detecting accuracy of the acceleration.

In the first and second embodiments, the detecting circuits 16 and 31 connected to the angular velocity sensor 1 output a voltage signal which is substantially proportional to the variation ratio of the capacitances of the first and second sets of capacitors 15A, 15B. In the third embodiment, the construction is made in which the detecting circuit 50 that is connected to the acceleration sensor 41 outputs a voltage signal that is substantially proportional to the amount of variation in capacitance. However, the present invention is not limited to these embodiments. The angular velocity sensor 1 may be constructed to be connected to the detecting circuit 50. In addition, the acceleration sensor 41 may be constructed to be connected to the detecting circuits 16 and 31.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An external force detecting device, comprising:
   n fixed electrodes supported by said substrate, n being an integer greater than 1;
   n moveable electrodes which are located at nominal positions relative to the fixed electrodes when they are at rest and being moveable in a detection direction in response to an external force applied thereto so as to vary the relative locations of the fixed and moveable electrodes;
   n/2 electrode pairs, each electrode pair including a respective fixed electrode and a respective moveable electrode that together define a variable capacitance whose capacitance varies as a function of the distance therefrom, the electrode pairs being divided into first and second sets of electrode pairs, the fixed and moveable electrodes of the first set of electrode pairs being spaced from one another by a first inter-electrode distance when the moveable electrodes are in their nominal positions, the fixed and moveable electrodes of a second set of electrode pairs being spaced from one another by a second inter-electrode distance when the moveable electrodes are in their nominal positions, the dimension ratio of the first inter-electrode distance to the second inter-electrode distance falling within the range of 1:2 to 1:5; and
   a detector for detecting the displacement of the moveable electrodes relative to the fixed electrodes as a function of the variation in the ratio of the overall capacitance of the first and second sets of electrode pairs resulting from movement of the moveable electrodes in response to an application of the external force.

2. The external force detecting device of claim 1, wherein the number of electrode pairs in the first set of electrode pairs is equal to the number of electrode pairs in the second set of electrode pairs.

3. The external force detecting device of claim 1, wherein at least one of the moveable electrodes forms two separate electrode pairs with two different fixed electrodes.

4. The external force detecting device of claim 3, wherein at least one of the fixed electrodes form separate electrode pairs with two different moveable electrodes.

5. The external force detecting device of claim 1, wherein the fixed and moveable electrodes are supported on the same substrate.

6. The external force detecting device of claim 5, wherein the fixed electrodes are provided on the substrate.

7. The external force detecting device of claim 6, wherein the moveable electrodes are supported by a moveable platform which is supported on the substrate by at least one support beam.

8. The external force detecting device of claim 5, wherein the moveable electrodes are supported by a moveable platform which is supported on the substrate by at least one support beam.

9. The external force detecting device of claim 1, wherein the detector generates an output voltage which is indicative of the variation of the ratio of the capacitances between the first and second electrode pairs.

10. The external force detecting device of claim 1, wherein each of the fixed and moveable electrodes are elongated in a direction perpendicular to the detection direction.

11. The external force detecting device of claim 1, wherein each of the fixed electrodes are finger electrodes.

12. The external force detecting device of claim 1, wherein the fixed electrodes are fingers of one or more fixed comb electrodes and the moveable electrodes are part of one or more moveable comb electrodes.

13. The external force detecting device of claim 12, wherein respective pairs of the fixed and moveable comb electrodes are interdigitated with one another.

14. The external force detecting device of claim 13, wherein the detector includes a field-effect transistor for converting the variation in the ratio of the overall capacitance of the first and second sets of electrode pairs into voltage signal and for outputting a detection signal as a function thereof.

15. The external force detecting device of claim 1, wherein the detector includes an operational amplifier for converting the variation in the ratio of the overall capacitance of the first and second sets of electrode pairs into a voltage signal and for outputting a detection signal as a function thereof.

16. An external force detecting device, comprising:
   n fixed electrodes supported by said substrate, n being an integer greater than 1;
   n moveable electrodes, the moveable electrodes being located at nominal positions relative to the fixed electrodes when they are at rest and being moveable in a detection direction in response to an external force applied thereto so as to vary the relative locations of the fixed and moveable electrodes;
   n/2 electrode pairs, each electrode pair including a respective fixed electrode and a respective moveable electrode that together define a variable capacitance, whose capacitance varies as a function of the distance therefrom, the electrode pairs being divided into first and second sets of electrode pairs, the fixed and moveable electrodes of one half of the electrode pairs being spaced from one another by a first inter-electrode distance when the moveable electrodes are in their nominal positions, the fixed and moveable electrodes of a second set of electrode pairs being spaced from one another by a second inter-electrode distance when the moveable electrodes are in their nominal positions, the ratio of the first inter-electrode distance to the second inter-electrode distance falling within the range of 1:1.7 to 1:3.5; and
   a detector for detecting the displacement of the moveable electrodes relative to the fixed electrodes as a function of the variation in the magnitude of the overall capacitances of the electrode pairs resulting from movement of the moveable electrodes in response to the application of the external force.

17. The external force detecting device of claim 16, wherein at least one of the moveable electrodes forms two separate electrode pairs with two different fixed electrodes.

18. The external force detecting device of claim 17, wherein at least one of the fixed electrodes forms two separate electrode pairs with two different moveable electrodes.

19. The external force detecting device of claim 18, wherein the fixed and moveable electrodes are supported on the same substrate.

20. The external force detecting device of claim 19, wherein the fixed electrodes are provided on the substrate.

21. The external force detecting device of claim 20, wherein the moveable electrodes are supported by a moveable platform which is supported on the substrate by at least one support beam.

22. The external force detecting device of claim 16, wherein the moveable electrodes are supported by a moveable platform which is supported on the substrate by at least one support beam.

23. The external force detecting device of claim 16, wherein the detector generates an output voltage which is indicative of the variation of the capacitance of the electrode pairs.

24. The external force detecting device of claim 16, wherein each of the fixed and moveable electrodes are elongated in a direction perpendicular to the detection direction.

25. The external force detecting device of claim 16, wherein each of the fixed electrodes are finger electrodes.

26. The external force detecting device of claim 16, wherein the fixed electrodes are part of one or more fixed comb electrodes and the moveable electrodes are part of one or more moveable comb electrodes.

27. The external force detecting device of claim 26, wherein respective pairs of the fixed and moveable comb electrodes are interdigitated with one another.

* * * * *